United States Patent [19]

Davis

[11] Patent Number: 5,027,419

[45] Date of Patent: Jun. 25, 1991

[54] OPTICAL IMAGES BY QUADRUPOLE CONVOLUTION

[75] Inventor: Ronald S. Davis, Deep River, Canada

[73] Assignee: Atomic Energy of Canada Limited, Ottawa, Canada

[21] Appl. No.: 330,895

[22] Filed: Mar. 31, 1989

[51] Int. Cl.[5] .......................... G06K 9/52; G06K 9/64
[52] U.S. Cl. ........................................ 382/28; 382/27; 382/42; 382/65
[58] Field of Search .................... 382/28, 42, 27, 65

[56] References Cited

U.S. PATENT DOCUMENTS

3,088,096 4/1958 Steinbuch ............................ 382/28
3,181,120 4/1965 Lieberman ....................... 340/146.3
4,301,443 11/1981 Sternberg et al. ................ 340/146.3
4,720,871 1/1988 Chambers ............................ 382/42
4,736,440 4/1988 Chabert ................................ 382/41

Primary Examiner—Leo H. Boudreau
Assistant Examiner—Steven P. Klocinski
Attorney, Agent, or Firm—R. John Haley; Y. Toyooka

[57] ABSTRACT

The invention described is a process of and an apparatus for recognizing the size, location, orientation etc. of an object without human intervention. The convolution technique is used to solve the field theory equations to generate linearity signals characteristic of points in the optical image of the object. The linearity signal is perception of linear or strip-like features in an image. The recognition is achieved by analyzing the linearity signals.

15 Claims, 5 Drawing Sheets

OPTICAL IMAGES BY QUADRUPOLE CONVOLUTION

FIELD OF THE INVENTION

The present invention relates to a process of and an apParatus for recognizing the shape, location and orientation etc. of an object without human intervention. In particular, the convolution technique is used to generate signals characteristic of points in the optical image of the object — —one signal for each point which signal is hereinafter referred to as the "linearity" signal of the image at that Point. The recognition of the object is achieved by analyzing the linearity signals.

BACKGROUND OF THE INVENTION

Numerous techniques have been proposed and patented for pattern or character recognition. Some examples are discussed in the following articles and patents.

IBM Tech. Discl. Bull., Vol. 18, No. 3, Aug. 1975, pp 681-686, "Decision Function Design Algorithm for Pattern Recognition", by King, Jr. et al. This article teaches technique and algorithm which identify a pattern of an incoming image on the basis of a one-dimensional array of numbers that represent features. Unlike the present invention, this technique is unable to recognize two-dimensional actual geometry of the image without first converting the two-dimensional array of pixels into one-dimensional array. A similar technique is described in another IBM Tech. Discl. Bull., Vol. 16, No. 1, June 1973, pp 97-99, "Sequential Pattern Recognition Machine", by Hopkins et al.

Canadian Patent No. 1,210,870 Sept. 2, 1986 (Pastor). This patent discloses a process to extract linear features, for example, in images of characters. The process also uses the convolution technique. However the distinction that characterises any particular convolution technique is the kernel(s) of the convolution(s). The kernels of the convolutions in the patent are very different from those used in the linearity analysis of the present invention. Some of the are specific points of difference are:

b 1. The kernels used in the linearity analysis of the present invention are function of angle multiplied by a function of radial distance. Those used in the Canadian Patent are functions of horizontal distance multiplied by functions of vertical distance.
2. The kernels used in the linearity analysis of the present invention span the full image. The kernels used in the patent are only a few pixels long and one pixel wide.
3. The kernels used in the linearity analysis of the present invention have functional dependence $1/r^2$ in one direction and $\sin(2\theta)$ or $\cos(2\theta)$ in the other direction. The kernel used in the patent have functional dependence $abs(x_{max}-x)$ in one direction and no functional dependence at all in the other direction.
4. The linearity analysis of the present invention produces results that are independent of the size of the image that is analyzed. The patent requires prior knowledge of the sizes of images to be analyzed.
5. The linearity analysis of the present invention produces features; specifically, it produces results specifying direction and distinctness of linear features. The patent produces modified images.
6. The linearity analysis of the present invention produces numerical results. The patent produces binary results.

Canadian Patent No. 1,218,156 Feb. 17, 1987 (Pastor et al). This patent is for hardware to run the process disclosed by the preceeding patent and the same considerations are therefore applicable to it. Canadian Patent No. 1,089,988 Nov. 18, 1980 (Evans et al). The purpose of this process is primarily to encode image data in a compact form for storage and transmission. It does, however, have a side effect of producing information about length and orientation of linear feature in the image. The following are the differences between the patent and the linearity analysis of the present invention:

1. The patent is applicable only to binary image, i.e. only those in which each pixel can have one of only two possible values, e.g. black/white, one/zero or true/false.
2. The process of the patent does not produce a measure of the distinctness of a linear feature.
3. The process of the patent is based only on relationships among near neighbour pixels, while the linearity analysis of the present invention produces a result for each point of interest based on the entire image. Therefore, the results of the two processes are very different. In particular, the patented process will be much more sensitive to noise.
4. The patent does not use convolution.

In a typical digitized image, the image is represented by being divided into a (usually regular) disjoint and exhaustive array of cells, commonly known as "pixels". Each pixel is approximated as being uniform and is characterized by a single number, its "value", representing typically an average of the intensity of light in the part of the image covered by that pixel. The image is represented by the set of these values stored in a numerical memory device.

An example of the sort of linear features is the strokes that compose the image of an alphabetic character. A reliable methods of discernment of these strokes could lead to a great improvement in processes for the reading of printed text by machine.

Other processes call for the detection of linear features in an image derived by some arithmetic process from an image prepared as above. The presently proposed process is equally applicable to such a derived image. An example of such a derived image is the magnitude of the pixel-to-pixel variation of an image prepared as above. In the derived image, a linear feature corresponds to an edge. Such edge detection might, for example, be useful in guiding a robot's hand to embrace an object it is to move.

The known processes respond strongly to noise, i.e. imperfection of reproduction, which is very common in digitized images. Causes include the imperfect fit of an object's outlines to the pattern of pixels (digitizing noise), dust on the object or optical elements, and random electronic events. Cumbersome post-processing of the results from known processes is necessary to eliminate this noise and such processing tends also to negate the detection of the features the process seeks.

The prior art processes also tend to be specific to features in certain rather narrow size ranges and yield inaccurate indications of whether separated segments of the image with some common property are part of the same feature; that is, they lack a holistic perception of the image. For this reason, most prior art machine vision processes do not use any process for the detection of linear features, but rather analyze images by various sorts of shape analysis.

An example of the resulting limitations is that optical character reading machines have difficulty distinguishing between "S" and "5", and between "Z" and "2". Since they do not discern lines, or do so only crudely, they are unable to distinguish between smooth curves and corners. Instead, they attempt to distinguish these pairs on the basis of characteristics that do not in fact define the characters. This provision makes them strongly sensitive to variations in font and to imperfect print quality. Another example of the resulting limitations is that robot vision devices require that items be presented to them in controlled orientation.

OBJECTS OF THE INVENTION

It is an object of the present invention to provide a method and an apparatus for generating the linearity field of the optical image of an object so that the shape, location and orientation of the object can b®recognized.

It is another object of the present invention to provide a method and an apparatus for generating the linearity field by the use of a field theory equation.

It is still another object of the present invention to provide a method and apparatus for generating the linearity field by convolution.

SUMMARY OF THE INVENTION

According to one embodiment of the present invention, a machine recognition process for recognizing the shape, location and orientation of an object by determining the linearity in the optical image of the object in an (x,y) cartesian coordinate system, includes steps of capturing the optical image in an image field defined in the (x,y) system, and generating an image signal $v(x',y')$ for each point $(x',y')$ in the image field. The process further includes a step of deriving a linearity signal $L(x,y)$ for each point $(x,y)$ in the image field by means of convolution expressed by the following equation:

$$L(x,y) = \iint_{\text{The image}} dx'dy'\, Q(x-x', y-y')\, v(x',y')$$

where $Q(x-x',y-y')$ is the kernel and has the value:

$$Q(x-x',y-y') = 1 / ((x-x')+i(y-y'))^2$$

where i is the square root of −1. A certain set of the linearity signals for points in the image field is selected and analyzed in view of prestored reference parameters so that the optical image of the object is recognized.

According to another embodiment of the present invention, an image recognition apparatus for recognizing the shape, location and orientation of an object by determining the linearity in an optical image of the object in an (x,y) cartesian coordinate system includes image means for optically capturing the optical image in an image field defined in the (x,y) system and image signal means for generating an image signal $v(x',y')$ for each point $(x',y')$ in the image field. The apparatus further has linearity signal means for deriving a linearity signal $L(x,y)$ for each point $(x,y)$ in the image field by means of convolution expressed by the following equation:

$$L(x,y) = \iint_{\text{The image}} dx'dy'\, Q(x-x', y-y')\, v(x',y')$$

where $Q(x-x',y-y')$ is the kernel and has the value:

$$Q(x-x',y-y') = 1 / ((x-x')+i(y-y'))^2$$

where i is the square root of −1. Selection means is provided for selecting a certain set of linearity signals for points in the image field and analysis means for analyzing the set of linearity signals in view of prestored reference parameters so that the optical image of the object is recognized.

BRIEF DESCRIPTION OF THE DRAWINGS

Other objects, features and advantages of the present invention will be apparent from the following description taken in connection with the accompanying drawings, wherein.

DETAILED DESCRIPTION OF PREFERRED EMBODIMENTS

The inventor has realized that a mathematical idea that has long been used in an unrelated area of theoretical physics, classical field theory, seems to offer a method of representing with achievable artificial computing equipment the action of a major component of the organic vision system. The results obtained agree strikingly with human intuitive perception, while at the same time it can gauge properties of an image with a high precision in relation to the resolution of the image.

The process is well suited to present-day computing hardware because it has the effect of replacing an essentially logical process with an essentially numerical one. This is an important practical advantage because a computer can access a word representing a number, and perform arithmetic on it, almost as quickly as the computer can access a bit and perform a Boolean operation on it, but the amount of information derived from the numerical process can be much greater, as evidenced by the much larger number of bits involved. Furthermore, since the newly considered process seems to occur in organic vision systems, it is even more amenable to rapid hybrid computing.

The two-dimensional arrays of brain cells used in brains' visual processes may be thought of, in analogy with mechanical visual processes, as containing one set of brain cells per pixel. However, the number of pixels is orders of magnitude larger than the number that could be represented on artificial computing machinery (as would be expected from the computing power available). From a mechanical point of view, the number of pixels might as well be infinite.

Even in the intricate structure of a human brain, however, the larger number of pixels probably imposes a practical limitation, that the processing performed on any pixel can only depend on the content of that pixel and its near neighbors. Consequently, a basic requirement in machine vision is to represent an essentially infinite number of simultaneous near-neighborhood interactions.

This need is not new. It was encountered in the 19th century by theoretical physicists seeking to solve "field" equations. A field, in this context, is a physical phenomenon represented by a function that has a value defined at each point in geometrical space. The fields considered in classical field theory, such as Maxwell's equations for electromagnetic fields, obey partial differential equations for multidimensional space - the ultimate extreme in numerous, near-neighborhood interactions.

Almost equally long known is the need to use the continuous equations of classical field theory as approximations for processes that in fact involve a large but finite number of discrete interactions. Heat diffusion is such a process because of the large number of atoms involved in a typical practical problem.

(a) Field Theory

Classical field theory was developed to help solve equations of this sort with the limited computing resources available in the 19th century. Perhaps equally importantly, it was developed also to help humans gain an intuitive understanding of the solutions, and the phenomena they represent. Similarly, when classical field theory is applied to problems of image comprehension, it achieves a step toward bringing these problems within the capability of practical computing machinery and it aids one's understanding of visual processes— even suggesting certain processes that may occur, although they have not yet been directly detected, in organic brains.

The emphasis in this work is one of the understanding of images that consist of lines. The term "lines" is used here not in the geometrical sense, but rather in the more everyday sense of a two-dimensional figure whose length exceeds its breadth enough to give a viewer an impression of linearity. A visual line is often used as a representation of a geometrical line, as for example in a line drawing, but a visual line often departs strongly from the geometrical ideal, as for example in a stroke in bold-face type.

The primary reason for this emphasis on linear images is that direct measurements of the signals in optic nerves show that a retina transmits a signal indicating the change in the value of an image as a function of position, rather than a direct reproduction of the image. Since a typical image consists of a set of surfaces, each with a fairly constant value, a typical signal in an optical nerve consists essentially of a line drawing, plus some information tacked onto each line to indicate the nature of the surfaces bounded by it.

This processing in the retina has evolved because the optic nerve can convey only about a hundredth the number of pixels in the retina, and only about a third of the dynamic range. Although we are not consciously aware of this processing, its effects can be indirectly observed in several ways in common observation.

This processing is reflected in the complete inability of a human to judge an absolute light level, and the resulting need of photographers for light meters.

An effect of this processing can be seen by looking at a half Moon. By objective measurement, averaging over the effects of surface features, the intensity of the image tapers off gradually to darkness at the terminator, and is constant right up to an abrupt cutoff at the opposite limb. However, a human perceives the Moon as having a constant value in the vicinity of the terminator, and an extra-bright boundary near the opposite limb. The sharp edge at the limb causes an enhancement of the perceived value information from the limb to be extrapolated all the way across the image. Similarly, a full Moon looks brighter at the limb even though it actually fades off there.

This processing explains the prevalence and ease of interpretation of line drawings, which date back to prehistoric times, in human culture. The retina transmits such images essentially unchanged into the optic nerve. Consequently, our response to linear images reflects processes at a somewhat higher level than the retina.

These observations are powerful motivation to focus attention on linear images as a step toward understanding and reproducing organic visual processes.

(b) Generation of Linearity Field by Convolution

Since linear features are of central importance in vision, it is fundamentally important to find linear features in an image. Mathematically, this means that an algorithm is necessary to answer the question: "Given the coordinates of a point, say (x,y), to what extent may this point be considered to be in a linear feature, and what is the orientation of such linear feature?".

A field-theoretical approach to this problem is to suppose that each point in the image is a field source of strength proportional to the value of the image at that point. The answer to the above question is then sought by evaluating some linear function of the field in the neighbourhood of (x,y). The corresponding expression is the convolution of functions and is expressed as follows:

$$L(x,y) = \int\int_{\text{The image}} dx'dy'\, K(x,y,x',y')\, v(x',y') \qquad (1)$$

The
in which $L(x,y)$ is the function that expresses the answer to the above question, hereafter known as the "linearity function", $v(x',y')$ is the value of the image at $(x',y')$, $K(x,y,x',y')$ is a function that is chosen to yield the desired property in $L(x,y)$. In conventional terminology, it is called the "kernel" of the integral.

In practice, $v(x',y')$ is the pixel value at point $(x',y')$ and $L(x,y)$ is the output signal (linearity signal) that characterizes the point $(x,y)$ in the system.

After mathematical manipulations and practical reasoning, the following convolution equation is obtained:

$$L(x,y) = \int\int_{\text{The image}} dx'dy'\, Q(x-x', y-y')\, v(x',y') \qquad (2)$$

where $$Q(x-x', y-y') = 1/((x-x')+i(y-y'))^2 \qquad (3)$$

is the kernel and i is the square root of $-1$. The operation of integration in the above expression may be approximated or otherwise represented by any of several mechanical processes as will be discussed below.

The linearity field of an image has a number of properties, beyond those that are specifically imposed in the procedure by which it is derived, that add to its importance in the understanding of an image.

Outside an infinitely long line, the linearity field is zero, and close alongside a long line the field is small. This is fundamentally important because it means that the perception of line is essentially unaffected by other lines nearby. The biggest problem in machine vision is detection of an object of interest in a cluttered background, and this result shows that the derivation of the linearity field is a step toward the solution of this problem. Similarly, if the image of the object of Interest consists of a number of lines, the perception of each line is not much influenced by the other lines.

An additional consequence of the fact that the linearity field due to a line is approximately zero outside the line is the further simplification that the field within a long line is approximately independent of position within the line. This may be seen by considering the line to consist of a bundle of thin, adjacent, parallel sublines. Then the subline that contains the point of evaluation of the field makes a contribution to the field there that swamps the contributions of the other sublines. This result can further assist image understanding.

The resulting quantity is a complex number, and consequently for practical purposes the output signal, $L(x,y)$, consists of a pair of numbers in an analog or digital representation for each point $(x,y)$. Conventional mathematical terminology labels the two numbers the "real" part and the "imaginary" part of $L(x,y)$, although both numbers have equally genuine significance for the practical purposes of the present invention.

The signal, $L(x,y)$, indicates any linear feature in which the location $(x,y)$ may lie as follows. The magnitude indicates the degree to which the point $(x,y)$ lies in a linear feature; being for example zero inside a square and $\pi$ inside a very long, thin stripe. The real part is positive to the extent that the point $(x,y)$ lies inside a horizontal stripe and negative to the extent that the point $(x,y)$ lies inside a vertical stripe. The imaginary part similarly indicates the degree to which the point $(x,y)$ lies inside a 45° diagonal stripe sloping forwardly for positive values and backwardly for negative values.

(c) Approximation of Integral

If the apparatus performs the above convolution by digital computation, the apparatus may approximate the above integral as a sum, with a term for each pixel. Each term will use a value of $(x',y')$ and of $v(x',y')$ characteristic of the pixel to which it belongs. The summation is expressed as follows:

$$L(x,y) = \sum\sum_{\text{All pixels}} v(x',y') Q(x-x',y-y') \quad (4)$$

Testing indicates that this is an adequately precise approximation for practical purposes.

The process may employ a previously calculated table of values of $Q(x-x',y-y')$, which need only be a two-dimensional table since $Q$ is a function of only two variables and the calculation of these variables, $x-x'$ and $y-y'$, is equivalent to known address arithmetic.

Another digital process by which the apparatus could Prepare the signal $L(x,y)$ is useable if the preprocessing leaves only one of a few possible values (e.g. two, "black" and "white") in each pixel. Then the apparatus may evaluate $L(x,y)$ as a product and quotient of complex numbers representing the Cartesian coordinates of the corners in the image. This may be a faster embodiment of the new process in some applications.

The treatments described thus far are in the Cartesian coordinate system. In some instances, the polar coordinate system may be more useful. The conversion between these coordinate systems can be easily effected by following equations:

$$x = r \cos \theta$$

$$y = r \sin \theta$$

wherein $r$ and $\theta$ are polar coordinate values.

(d) Analog Computation of Linearity Field

If the apparatus prepares its output signal by analog computation, it may employ the fact that $Q(x-x',y-y')$ is a solution of Laplace's equation in two dimensions, $$\left(\left(\frac{\partial}{\partial x}\right)^2 + \left(\frac{\partial}{\partial y}\right)^2\right) Q(x-x',y-y') = 0 \quad (5)$$

so that any physical process that obeys this equation may provide the analog by means of which the linearity signal is prepared.

Figure 1:
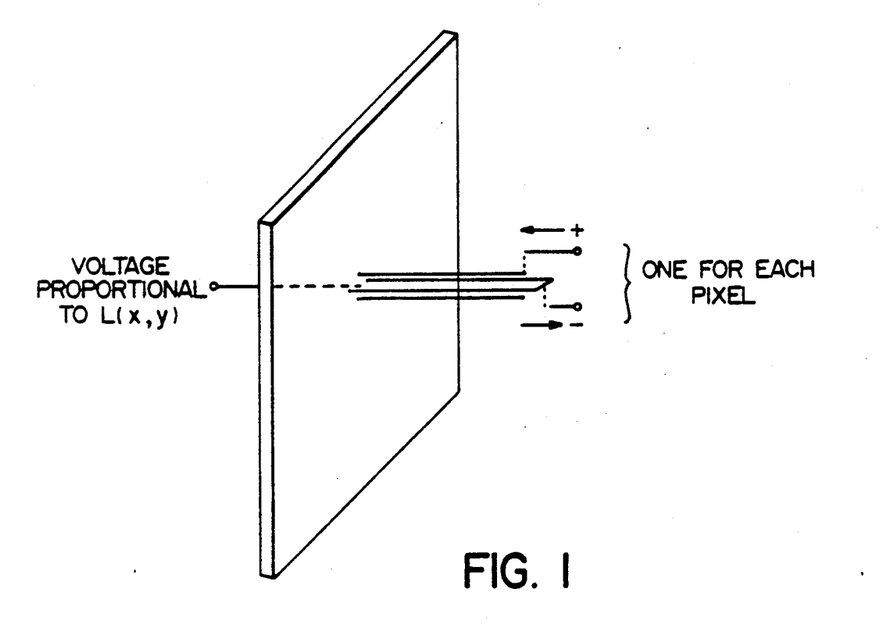
FIG. 1 is a schematic illustration of an analog calculator for a pixel of an optical image according to one embodiment of the present invention.

A particular example is the conduction of electricity in a resistive sheet. FIG. 1 represents a manner in which the apparatus could use this phenomenon to evaluate the output signal. In this example, a planar sheet of resistive material represents the image plane. Inside the part of it representing each pixel, four leads make electrical contact with the sheet. The contact points of the four leads in each pixel are at the corners of a square. To prepare the real part of the signal $L(x,y)$, the two diagonals of the square are horizontal and vertical. Into each of the two leads at each end of each horizontal diagonal, the apparatus feeds a current proportional to the value of the pixel, while the apparatus feeds equal and opposite current to the other two leads in the pixel. To prepare the imaginary part of the signal $L(x,y)$, the same configuration is used except that the set of four contact points in each pixel is rotated 45°.

A set of leads centered at location $(x',y')$ and driven at a total current $v(x',y')$ will create a voltage in the plate at any point $(x,y)$ approximately equal to the real or imaginary part of $$C \, v(x',y') \, Q(x-x',y-y')$$

depending on which of the above configurations is used. (C is a constant characteristic of a particular combination of dimensions and materials in the device.) The contributions due to the various pixels, when the apparatus thus drives all of them at once, will add together to form the corresponding part of the signal $L(x,y)$.

The limitation of the approximation made by the above configuration is that the voltage due to each pixel's electrodes does not represent $Q(x-x',y-y')$ among or close to the set of current-feeding electrodes. The apparatus must therefore read off an average voltage over a region somewhat larger than that space, or the voltage at the precise center of a set of current-feeding electrodes, or the average voltage on all the current-feeding electrodes of a set. One way the apparatus can form a spacial average is by reading off the voltages on the side of the planar sheet opposite the current-carrying leads and using a sheet of a thickness roughly equal to the distance over which the apparatus is to take an average.

A possible variation on this analog configuration is that the configuration of four leads used as input for each pixel may be varied to any other configuration that will yield the appropriate spacial distribution of current (a point-source quadrupole field). One simplification is to use only three, colinear input contact Points per pixel, feeding in the representation of $v(x',y')$ through the central lead of each set and drawing half the return current through the each of the other leads. Each line of leads would be vertical or horizontal to evaluate the real part, diagonal to evaluate the imaginary part. Another simplification is to use only one input lead per pixel, feeding in the signal for each pixel through the leads of four neighbours. Another possible variation is that the roles of voltage and current may be exchanged.

In addition to the conduction of electricity in a resistive sheet, the Laplace's equation is applicable, among other things, to the conduction of heat and the deformation of a membrane. There are thin fiber optics which sense temperature difference between the fiber optics and surrounding medium. These fiber optics can be used for measuring changes in temperature in the field of the optical image.

Figure 2:
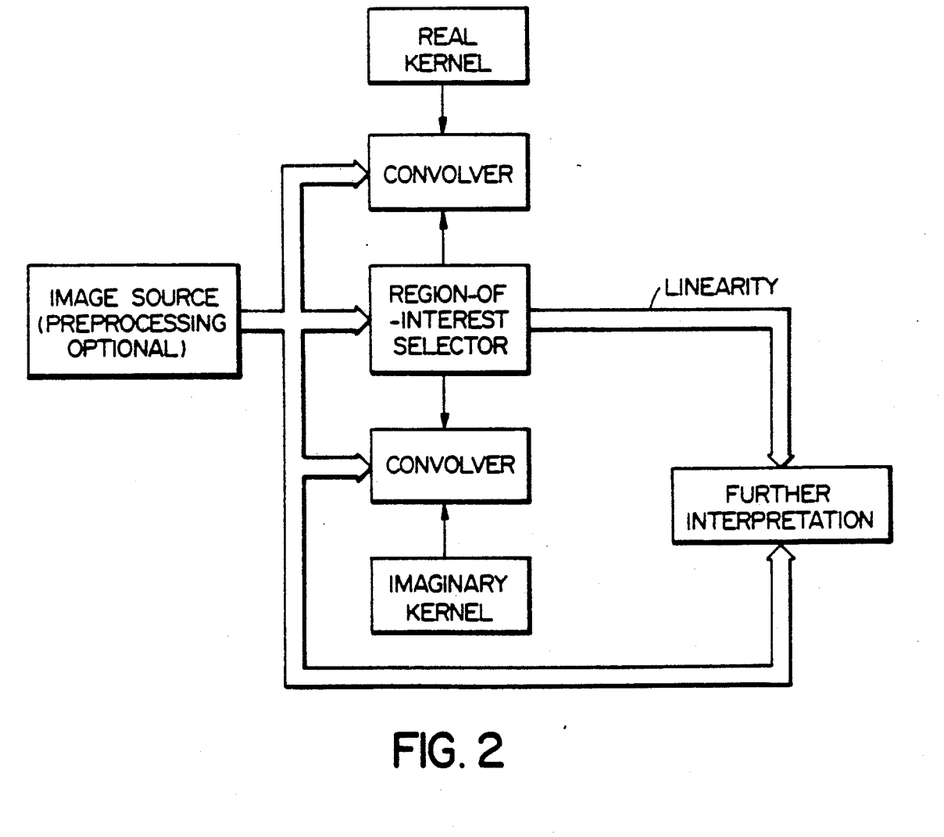
FIG. 2 is a block diagram of the operation of the present invention according to one embodiment.

FIG. 2 shows a block diagram of the operation of the present invention where the linearity field of an image is generated, processed, and analyzed. In the figure "image source" may be a camera that puts out an image to analog form, or a camera that puts out an image in digital form, or may be either of the above camera followed by some low-level Process or processes such as backgrounding or thresholding. Backgrounding is the replacement of the value of such pixel by its value minus some average of the values of nearby pixels. Thresholding is the replacement of the value of each pixel by binary indication of whether that pixel is above a predetermined value (the threshold value).

The image may be fed into a region-of-interest selector to determine the location(s) in it at which the linearity is to be evaluated, or the convolvers may simply evaluate the linearity at a fixed set of points in the image, for example at the center of each pixel. This decision will depend primarily on the speed of the convolvers.

The above operations may be performed in a stored-program computer, in which case the above convolutions can be performed by conventional looping techniques.

(e) Characteristics of Linearity Field

The benefit of the above procedure lies in the unique properties of the signal, $L(x,y)$, as it is determined by an image. As the above equations indicate, the signal $L(x,y)$ is a sum of contributions derived from everywhere in the image. This characteristic is of course necessary (though not sufficient) for the process to yield a holistic Perception of linear features. Thus, for example, if $(x,y)$ lies within a row of spots, even if the spots are themselves completely without linearity, the signal $L(x,y)$ will represent the row faithfully. Another important characteristic of the signal $L(x,y)$ is that a linear feature of the image that does not contain the point whose Cartesian coordinates are $(x,y)$ makes a negligible contribution to the signal. Specifically, the more linear the feature is, the smaller is its contribution to the signal characterising a point outside the feature. The contribution to a signal outside the feature approaches zero as the feature's ratio of length to width approaches infinitely. Thus, while the apparatus will signal a row of nonlinear spots as a linear feature, it will signal any set of linear features as a set of individual linear features. This characteristic is particularly valuable in complex or cluttered images. A third important characteristic of the signal $L(x,y)$ is that its value is invariant under scale change, so that the signal produced by the above process is characteristic only of a shape, and not of the size of the feature in the image.

It is helpful for explanatory purposes to consider the properties of the square root of the number $L(x,y)$, although this square root will not be necessary for many applications of the present process. If the real and imaginary parts of this square root are considered to be the Cartesian components of a vector, then the vector will have magnitude that is greater the more distinctly linear is the region of the image containing the point $(x,y)$. The vector will point in the direction in which such linear feature is oriented. A square root has two possible values. In the above description this ambiguity will lead to two possible vectors at each point. The two vectors will point in directions 180° apart, and hence will both point in the direction in which any linear feature is oriented.

FIGS. 3–8 show results of the experiments wherein sets of values of $L(x,y)$ were calculated as above from real, badly digitized images and resulting values of the square root of $L(x,y)$ are represented as vectors. Because of the equivalence of two directions 180° apart, the plotted vectors are without arrowheads. The images from which these values are plotted are black-and-white images with no intermediate gray levels. The images are indicated by the fact that the square root of $L(x,y)$ is plotted in the black pixels and not in the white ones.

The linearity values that are not shown in FIGS. 3–8 are substantially zero because they are evaluated in white regions and hence outside the linear features of the images. When the image is of a page of type, the linearity in a white Part of a character (or "counter") works out to a horizontal value, representing the line of type containing the character. The magnitude is low because the line of type is only partly black and contains mostly linear features.

For sample images, optical characters are chosen because it is believed that they are likely to be a far better indicator of how we perceive images than has previously been recognized because they have evolved over thousand of years toward the conflicting goals of being as easy to recognize as possible, of having as wide a variety of representations of each character as possible, and of being as easy to produce as possible. For this reason, the results described here, even though they are related to characters, are applicable to the understanding of almost any image. The term "black" can be generalized to mean "having high edginess", the term "counter" can be generalized to mean "outlined area", and so on.

In an image of something other than a character, the image will presumably be edge-detected before the linearity field is evaluated. The counterpart of a counter is then a region of low variation of value. In a gray-level image, Presumably the interpretation of the linearity field must be weighted according to the intensity of the "edginess" of the image.

Figure 3:
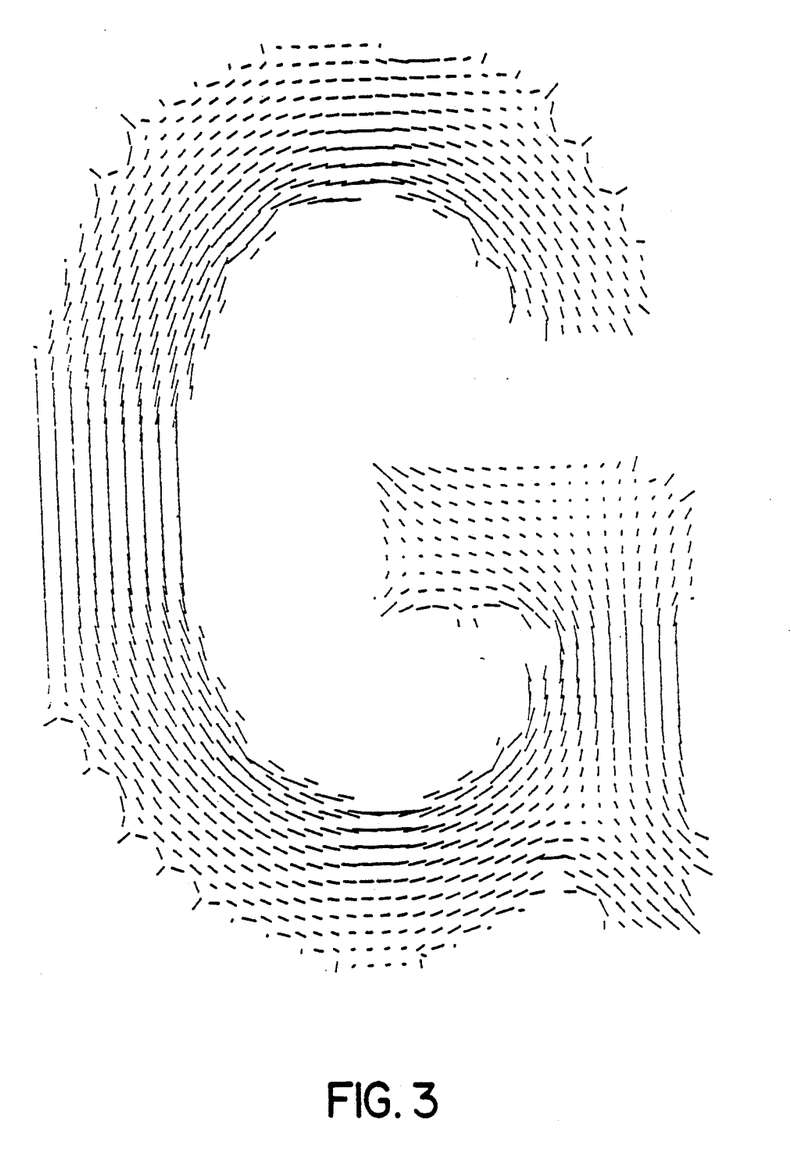
FIGS. 3–8 illustrate the results of experiments of the present invention showing the linearity fields of various characters.
Figure 4:
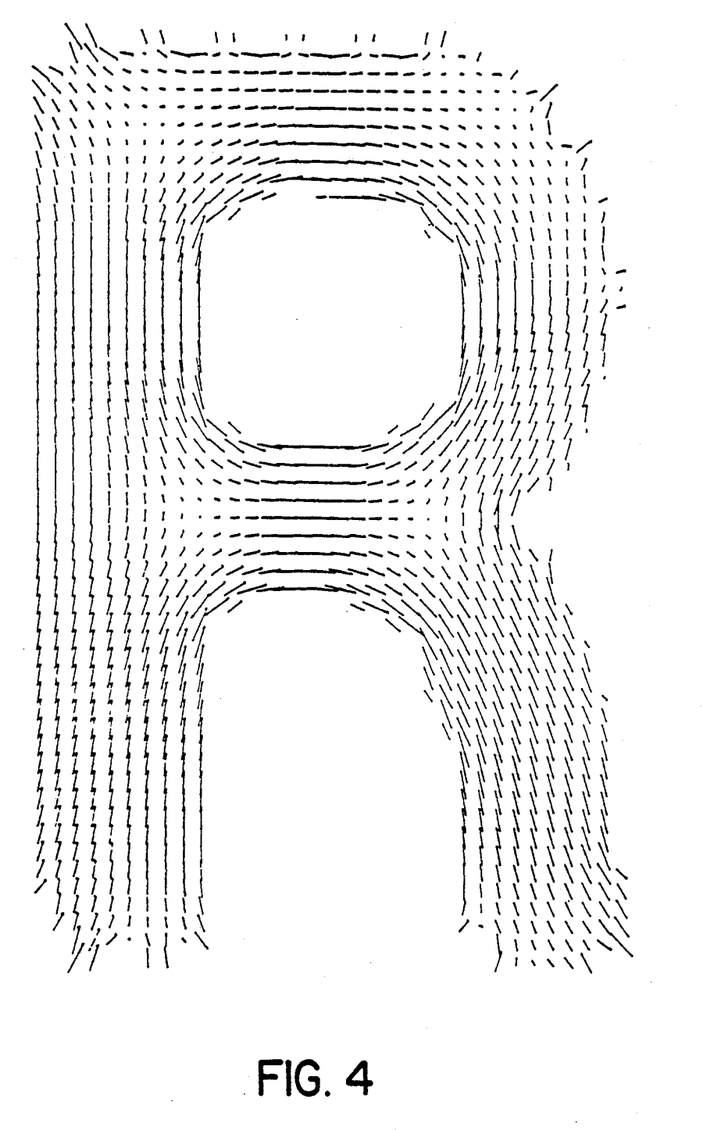
Figure 5:
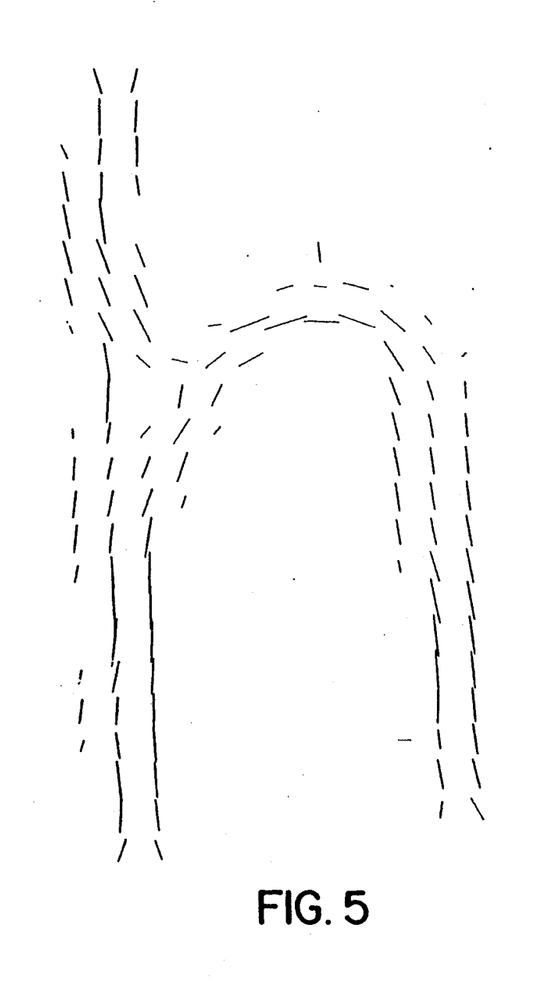

FIGS. 3 and 4 show the linearity fields in a few letters in Times Roman, a typeface that is particularly widely used and hence that may be thought of as particularly conventional. The important characteristic of these figures is the subjective characteristic that the line segments representing the linearity field are aligned and agree in relative magnitude with the linearity that a human perceives at each point in the character. These fields show, exaggerated, the effect of digitizing error. As the above equation shows, the linearity field becomes infinite as a corner is approached. In a rectangular, vertical-horizontal tessellation, there are corners along the boundaries of oblique lines. These corners make the imaginary part blow up. This blowup is particularly evident along some of the sides of the diagonal strokes in the figures. The reason the digitizing error in FIG. 3 and 4 is exaggerated is a quirk in the camera that was used to acquire the image. The camera has its light-sensitive spots clustered into small groups of four, as is evidenced by the two-up and two-across steps on the sides of sloping strokes. The effect is that the digitizing error ranges up to almost a full pixel width, rather than the half pixel width that would normally be the upper bound on digitizing error. Digitizing error is not a serious problem in a properly digitized image because the blowup is only logarithmic, and therefore affects only a near neighbourhood of a corner. In a properly digitized image, digitizing error can be kept low simply by restricting field evaluations to the centers of pixels, i.e. forbearing to evaluate the linearity field at any point closer to a corner than half the digitizing error. The effect of this provision is shown in FIG. 5, which shows characters that have been digitized much more coarsely, but in which the digitizing error is only about half a pixel width and the field has been evaluated only at the center of each pixel. Even in these images, moderate digitizing error remains. This is consistent with the poor response of human perception to digitizing error - a coarsely digitized image actually becomes more comprehensible to a human when it is blurred. In particular, an odd extra black pixel on an otherwise smooth edge (e.g. the one on the right side of the counter of the "h") is perceived by a human as a protrusion, just as th(R)linearity field represents it.

In general, a lump of noise effects the linearity field Primarily at points that are right inside the lump. This is consonant with the characteristics of the linearity field in and around lines.

Figure 6:
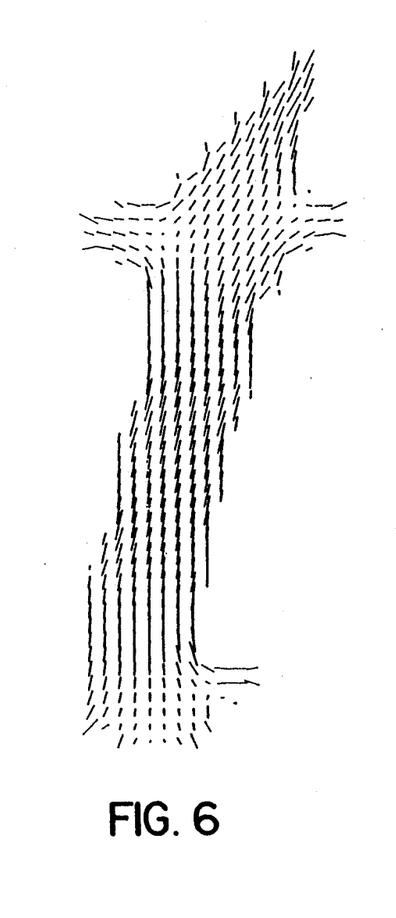

FIG. 6 shows the linearity fields in a bold-face type. Such type tends to be difficult for a machine trying to discern the strokes, because a stroke, when considered in isolation, may be no longer than it is wide, or even have a "length"" (i.e. a dimension measured along its correct direction) less than its "width". Such a stroke consequently has no discernable directionality, or even the wrong directionality, when considered in isolation, and depends on its environment in a holistic way for its definition. The linearity field reflects the existence of such strokes distinctly. The crossbar strokes in the "t" are no more protrusive than the spurious protrusions created by digitizing error in FIG. 5. This is consistent with the finding that the effect of digitizing error on the linearity field agrees with a human's perception of the digitizing error. Serifs make a stroke more linear, as defined by the linearity field, in spite of their interferences with the smoothness of the stroke. Consequently, the popularity of serifs in our culture is further evidence that the linearity field is indeed one of the means by which our brains perceive visually.

Figure 7:
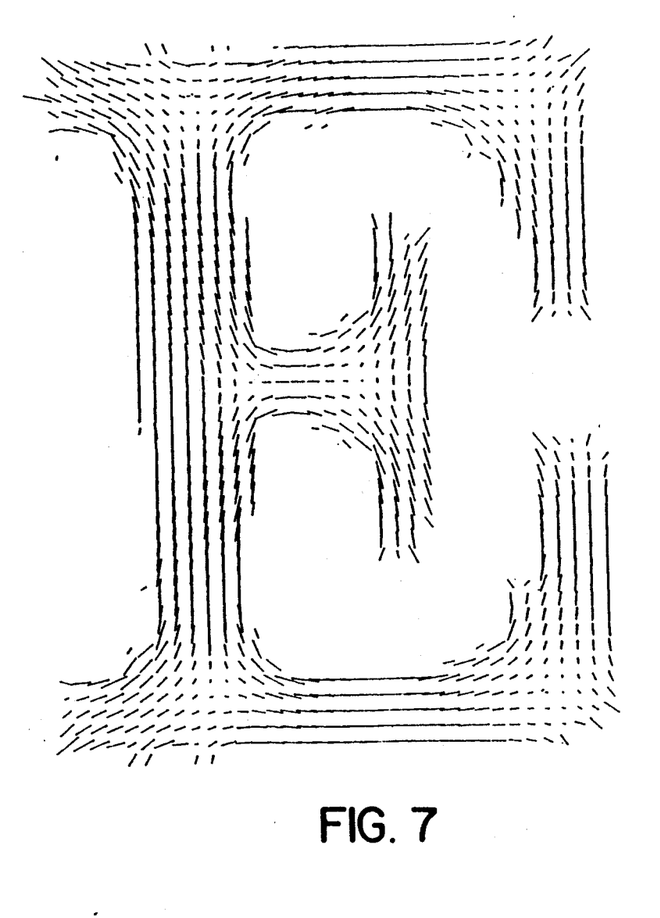
Figure 8:
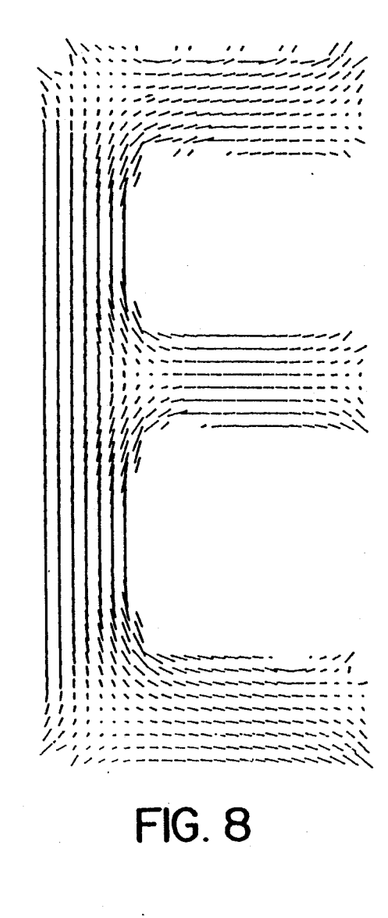

FIGS. 7 and 8 show characters with exaggerated serifs and with no serifs respectively. The noteworthy point here is that a strong similarity exists between the linearity fields near the ends of the strokes in the sans-serif typeface and the linearity fields in the serifs in the other typeface, even though the two typefaces differ greatly in those regions. The similarity suggest that another function of serifs is to emphasize the properties of the linearfty field that characterize the ends of strokes. Thus again, the great popularity of serifs in our culture is evidence that the linearity field is used in the human visual system.

These figures show that the linearity signal for a point anywhere in a linear feature will represent accurately the orientation and distinctness of that feature, with little effect from other parts of the image that are not parts of that feature. The linearity signal gives particularly clear distinction between corners and smooth curves—a problem of particularly great difficulty for other processes of understanding images. In a corner, the linearity signal contains a null, while in a smooth curve its magnitude is substantially constant. The image of FIG. 5 has such poor resolution and high noise that another method of discerning lines, corners etc. would have great difficulty.

(f) Analysis and Interpretation of Linearity Field

The linearity field thus obtained can be analyzed and interpreted by various methods so that images can be recognized. Following are some examples.

Function Fitting

Function fitting has several general characteristics that make it seem a logical step, to be applied to the linearity field, to extract information from an image. Function fitting can express properties of the entire field in a small set of coefficients. The technique is highly developed and familiar through long use. It is well suited to the capabilities of a conventional computer. Specific characteristics of the problem of machine vision also suggest that function fitting is useful. The response of the linearity field to digitizing error suggests that interpretation may be easier if smoothing is performed on the data, and function fitting is a well developed method of smoothing. Function fitting can yield interpolated values of the linearity in counters, which may be essential to the subsequent interpretation procedure. Smoothing is closely related to template matching, so that the two processes may be economically combined.

There again are several techniques available for function fitting, e.g. least-square polynominal fitting and template matching. It is also possible to interpret "zeroes" in the linearity field at which points the magnitude of the linearity signal is zero. A zero occurs in a corner and not in a curve.

Hough Transform

The Hough transform has not yet been used with a linearity field, but a form of it that the present inventor have developed has proven highly successful in a related task of image understanding, a circle finding algorithm. Further analyses indicate that procedures based on the extended version of the Hough transform and using the linearity field as input are likely to be even more useful for practical tasks of machine vision. The Hough transform is a method to find whatever fragments may exist of one or more curves of a particular type in an image, given a number of candidate points each of which may or may not lie on a curve of the type sought. Candidate points for possible membership in a curve will typically be points of high edginess.

In general, a family of curves in the image plane may be defined by the equation:

$$f(x,y,a,b,c,\ldots) = 0 \qquad (6)$$

in which a, b, c, . . . are parameters that distinguish members of the family of curves from each other, and x and y are Cartesian coordinates of any point that lies on the specified curve. For example, if:

$$f(x,y,a,b,c) = (x-a)^2 + (y-b)^2 - c^2 \qquad (7)$$

then the equation (6) would be the equation of a circle with center at (a,b) and radius c. The Hough transform procedure is to define a field in the space spanned by the parameters a, b, c, . . . . The field in this space is initialized to zero. Then, for each black pixel in the image, this field is incremented for all sets of values of a,b,c, . . . consistent with the location of the pixel. Figures present in the image lead to relative maxima in this field.

An improvement on the above procedure can be made if each point has associated with it a direction as well as position. Then equation (6) is supplemented by the additional equation:

$$\left[ \left( \frac{d}{ds} f(x + \alpha s, y + \beta s; a, b, c, \ldots) \right) \right]_{s=0} = 0 \qquad (8)$$

in which $\alpha$ and $\beta$ are the direction cosines associated with the point. The combination of equations (6) and (8) defines a smaller point set than the equation (6) alone does. With suitably defined parameters it reduces by one the dimensionality of the parameter space in which the voting has to be performed. Thus, the additional equation makes the process much more efficient.

The task of gauging the precise location of circles in workpiece that are well positioned can probably be performed better with a linearity field because its use can yield precise values of the orientation of an edge of a poorly resolved image and it can yield values at locations chosen independently of the tesselation so as to yield many values for averaging.

Extensive testing indicates that the linearity as signaled by the above-described process corresponds closely to the linearity as perceived by a human. Consequently, the above-described process is particularly advantageous in processes that contain a human element; for example, the understanding of symbols initially intended for humans to read, or the handling of items that are presented with only as many constraints as a human would require.

Typical industrial vision tasks more complicated than circle finding may require more complicated procedures. However, it is important to note that the linearity field analysis of the present invention gives precisely the sort of input that is needed by any process that broadly follows any of the afore-discussed procedures. Thus classical field theory is likely to solve many commercially important but hitherto impractical problems of machine vision.

I claim:

1. A machine recognition process for recognizing the shape, location or orientation of an object by determining the linearity in an optical image of the said object in an (x,y) Cartesian coordinate system, comprising steps of:

capturing the said optical image in an image field defined in the said (x,y) system, generating an image signal v(x',y') for each point (x',y') in the said image field, deriving a linearity signal L(x,y) for each point (x,y) in the said image field by means of convolution expressed by the following equation:

$$L(x,y) = \iint_{\text{The image}} dx'dy' \, Q(x - x', y - y') \, v(x',y')$$

where $Q(x-x', y-y')$ is the kernel and has the value:

$$Q(x-x', y-y') = 1 / ((x-x') + i(y-y'))^2$$

where i is the square root of $-1$, selecting a certain set of said linearity signals for points in the said image field, and analyzing the said set of linearity signals in view of prestored reference parameters so that the optical image of the object is recognized.

2. The machine recognition process according to claim 1, wherein:

the said step of capturing the said optical image includes a step of scanning the said image field in a raster pattern so that the said image field is made up of a matrix of discrete pixels defined in the said (x,y) system, and the said step of deriving the linearity signal L(x,y) further comprises a step of approximating the convolution by summation with respect to the said discrete pixels by the following equation:

$$L(x,y) = \sum_{\text{All pixels}} \sum v(x',y') \, Q(x - x', y - y').$$

3. The machine recognition process according to claim 2, wherein:

the said step of deriving the linearity signal L(x,y) further comprises a step of converting parameters between the said cartesian coordinate system and a polar coordinate system, using the following equations:

$$x = r \cos \theta$$

$$y = r \sin \theta$$

wherein r and $\theta$ are polar coordinate values.

4. The machine recognition process according to claim 2, wherein:

the said step of selecting a certain set of said linearity signals is being performed as the image field is being scanned.

5. The machine recognition process according to claim 2, wherein:

the said step of selecting a certain set of said linearity signals is being performed according to a predetermined region-of-interest criterion.

6. The machine recognition process according to claim 2, wherein:

the said step of deriving a linearity signal L(x,y) for each point (x,y) in the said image field comprises:

generating at each pixel a physical process which obeys Laplace's equation in two dimensions expressed by the following equation:

$$\left(\left(\frac{2}{2x}\right)^2 + \left(\frac{2}{2y}\right)^2\right) Q(x - x', y - y') = 0$$

where $Q(x-x', y-y')$ is the kernel.

7. The machine recognition process according to claim 6, wherein:
the said physical process is the conduction of electricity in a resistive sheet.

8. The machine recognition process according to claim 6, wherein:
the said physical process is the conduction of heat in a heat conductive sheet.

9. The machine recognition process according to claim 6, wherein:
the said physical process is the deformation of a membrane.

10. An image recognition apparatus for recognizing the shape, location or orientation of an object by determining the linearity in an optical image of the said object in an (x,y) cartesian coordinate system, comprising:
image means for optically capturing the said optical image in an image field defined in the said (x,y) system,
image signal means for generating an image signal $v(x',y')$ for each point $(x',y')$ in the said image field,
linearity signal means for deriving a linearity signal $L(x,y)$ for each point $(x,y)$ in the said image field by means of convolution expressed by the following equation:

$$L(x,y) = \iint_{\text{The image}} dx'dy' \, Q(x - x', y - y') \, v(x',y')$$

where $Q(x-x', y-y')$ is the kernel and has the value:

$$Q(x-x', y-y') = 1/((x-x') + i(y-y'))^2$$

where i is the square root of $-1$,
selection means for selecting a certain set of said linearity signals for points in the said image field, and
analysis means for analyzing the said set of linearity signals in view of prestored reference parameters so that the optical image of the object is recognized.

11. The image recognition apparatus for recognizing an object according to claim 10, wherein:
the said image means for optically capturing the said optical image includes scanning means for scanning the said image field so that the said image field is made up of a matrix of discrete pixels defined in the said (x,y) system, and
the said linearity signal means derives the linearity signal $L(x,y)$ for each pixel located at a point $(x,y)$ in the said image field and further sums the said linearity signals $L(x,y)$ for all the pixels.

12. The image recognition apparatus according to claim 11, wherein:
the said linearity signal means for deriving the linearity signal comprises:
Laplace means for generating at each pixel a physical process which obeys Laplace's equation in two dimensions expressed by the following equation:

$$\left(\left(\frac{2}{2x}\right)^2 + \left(\frac{2}{2y}\right)^2\right) Q(x - x', y - y') = 0$$

where $Q(x-x', y-y')$ is the kernel.

13. The image recognition apparatus according to claim 12, wherein:
the said physical process is the conduction of electricity in a resistive sheet.

14. The image recognition apparatus according to claim 12, wherein:
the said physical process is the conduction of heat in a heat conductive sheet.

15. The image recognition apparatus according to claim 12, wherein:
the said physical process is the deformation of a membrane.

* * * * *